March 17, 1970  J. A. SAKSA ET AL  3,501,187
AUTO-SAFETY SLEEVE
Filed Aug. 15, 1968
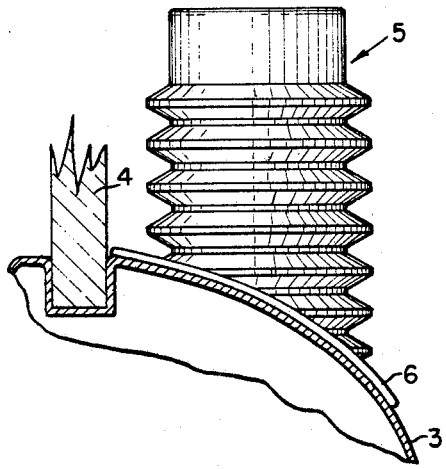
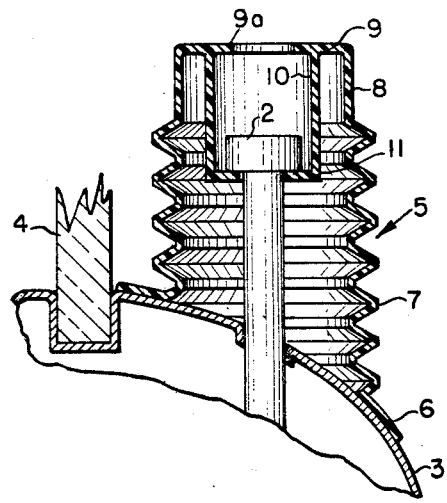
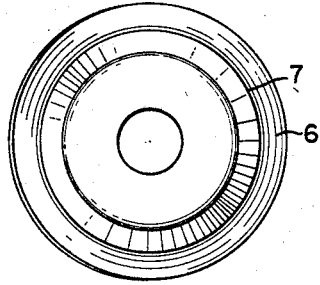
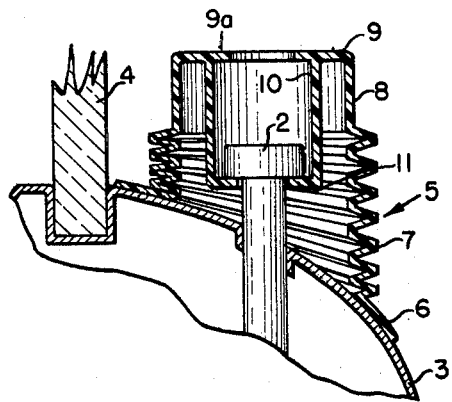
INVENTORS
THEODORE J. ZUPPA
JOHN A. SAKSA
BY
Scrivener Parker Scrivener + Clarke
ATTORNEYS 3,501,187
AUTO-SAFETY SLEEVE
John A. Saksa, 810 Laurann Ave., Tallmadge, Ohio
44278, and Theodore A. Zuppa, 3885 Neville
Drive, Brimfield, Ohio 44240
Filed Aug. 15, 1968, Ser. No. 752,905
Int. Cl. E05b 1/04; E05c 21/00
U.S. Cl. 292—1                    1 Claim

ABSTRACT OF THE DISCLOSURE

There is provided by the present invention a simple, inexpensive device adapted to be fitted over the locking plunger of an automobile door latch to prevent actuation thereof by persons desiring to gain illegal access to the automobile. The device comprises a tubular, resilient, corrugated device having a portion adapted to engage the knob portion of the plunger and a portion conforming to the configuration of the window rail.

---

The primary object of the present invention is to provide means to prevent actuation of the door locking plunger of an automobile door latch by unauthorized persons.

Heretofore, access to automobiles by unauthorized persons has been accomplished by cutting through the rubber weather stripping located adjacent the windows of the vehicle, inserting a wire or flat metal member in the hole so formed and then exert upward pressure on the wire or metal device to raise the locking button, thereby permitting access to the car.

The present invention overcomes this by the provision of the sleeve-like device which is fitted over the actuating plunger and which, due to its inherent resiliency, prevents actuation of the plunger by an object such as a bent wire or the like. Rattling of the plunger is also prevented.

The sleeve can be molded in any color, to conform to the decor of the automobile.

Other objects and advantages of the invention will become apparent from a study of the specification when considered in conjunction with the accompanying drawing, in which:

FIG. 1 is a perspective view of the safety device of the invention showing its relation to the door frame;

FIG. 2 is a top plan view of the device; and

FIG. 3 is a sectional view showing the device applied to the door locking plunger, the plunger being in its raised, inoperative position; and FIG. 4 is a sectional view of the device with the locking plunger of the door in its depressed, operating position.

Referring to the drawings, it will be seen that the safety device is adapted to be positioned over the door locking control plunger comprising a stem 1 and knob 2. The stem 1 is attached to locking mechanism, not shown, and extends through an opening in the window rail 3 which is provided with a slot through which the window 4 extends.

The safety device of the present invention comprises a generally cylindrical shaped tubular member 5 having a flanged portion 6 which conforms to the curvature of the window rail 3, an intermediate corrugated section 7 and an upper perpendicular wall section 8 provided with an inwardly extending annular flange or ring portion 9 provided with a lip portion 9a which overlies the knob 2 to prevent displacement of the knob during depression of the safety device. Depending from the inner edge of the annular flange 9 is knob engaging section comprising a depending tubular portion 10 and an inwardly extending flange portion 11 adapted to engage the under surface of the knob 2. The safety device is resilient, being composed of rubber, plastic or like material. In its normal position, FIG. 3, the safety device is slightly compressed to prevent its displacement due to the reaction between the underside of the knob 2 and the flange portion 11.

In use, the sleeve is placed over the lock actuating shank in such a manner that the flange 6 engages the curved section of the window rail 3 to which it may be affixed by gluing or the like. The sleeve is depressed slightly and the flange 11 positioned beneath the lower surface of the knob 2. When it is desired to lock the door of the car, it is only necessary to depress the actuating knob 2 to its locked position. The sleeve, due to its resiliency and the corrugated section, collapses to its depressed condition, as shown in FIG. 4. In the event an unauthorized person attempts to gain access, he will be thwarted due to the sleeve. If a wire or like device is inserted and it is attempted to raise the button by engaging the sleeve, the flange 11 will become disengaged from the knob 2 due to the extreme resiliency of the sleeve. Accordingly, actuation of the knob and its associated stem is effectively prevented.

While the preferred embodiment of the invention has been illustrated and described, it will be apparent to those skilled in the art that various changes can be made in the device described without departing from the invention.

What is claimed is:

1. A door safety device adapted to be attached to the window rail of an automobile door having locking mechanism including a stem and knob, said safety device comprising a resilient, tubular member coaxial with the stem and knob, said device having a flange section conforming to the curvature of the window rail, a corrugated central section, an upper wall section provided at its outer extremity with an annular flange and means attached to said flange and depending therefrom to engage the under surface of the said knob to thereby secure the safety device in position.

References Cited

UNITED STATES PATENTS

| 1,655,597 | 1/1928 | Devine | 135—5 |
| 3,037,099 | 5/1962 | Aandeweil | 200—67 |
| 3,082,028 | 3/1963 | Werle | 292—1 |

MARVIN A. CHAMPION, Primary Examiner

E. J. McCARTHY, Assistant Examiner

U.S. Cl. X.R.

292—347